(12) United States Patent
Seelbach et al.

(10) Patent No.: US 6,345,761 B1
(45) Date of Patent: Feb. 12, 2002

(54) METHOD AND DEVICE FOR PROCESSING BIOMETRIC DATA

(75) Inventors: Frank Seelbach, Salzkotten; Heiko Sochart, Paderborn, both of (DE)

(73) Assignee: Orga Kartensysteme GmbH, Paderborn (DE)

( * ) Notice: Subject to any disclaimer, the term of this patent is extended or adjusted under 35 U.S.C. 154(b) by 0 days.

(21) Appl. No.: 09/341,752

(22) PCT Filed: Nov. 3, 1998

(86) PCT No.: PCT/DE98/03199

§ 371 Date: Sep. 30, 1999

§ 102(e) Date: Sep. 30, 1999

(87) PCT Pub. No.: WO99/27500

PCT Pub. Date: Jun. 3, 1999

(30) Foreign Application Priority Data

Nov. 19, 1997 (DE) .......................................... 197 51 172

(51) Int. Cl.[7] .................................................. G06K 5/00
(52) U.S. Cl. ........................................ 235/380; 235/382
(58) Field of Search ................................. 235/380, 382, 235/382.5, 487; 902/1, 3, 4, 5; 705/35, 41, 43, 44

(56) References Cited

U.S. PATENT DOCUMENTS

| | | | |
|---|---|---|---|
| 4,210,899 A | * | 7/1980 | Swonger et al. ......... 340/146.3 |
| 4,790,564 A | | 12/1988 | Larcher et al. ................ 283/69 |
| 5,180,901 A | | 1/1993 | Hiramatsu ................... 235/380 |
| 5,473,144 A | * | 12/1995 | Mathurin et al. ............ 235/380 |
| 5,648,648 A | * | 7/1997 | Chou et al. .................. 235/382 |
| 5,869,822 A | * | 2/1999 | Meadows, II et al. ...... 235/380 |
| 5,907,149 A | * | 5/1999 | Marckini ..................... 235/487 |

FOREIGN PATENT DOCUMENTS

| | | | | |
|---|---|---|---|---|
| EP | 0343 580 | | 11/1989 | |
| EP | 0372 762 | | 6/1990 | |
| EP | 0924656 | * | 6/1999 | ............ G07C/9/00 |
| GB | 2 171 828 | | 9/1986 | |
| GB | 2 204 971 | | 11/1988 | |
| WO | 82/03286 | | 9/1982 | |
| WO | 98/01820 | | 1/1998 | |

* cited by examiner

Primary Examiner—Michael G. Lee
Assistant Examiner—Daniel St. Cyr
(74) Attorney, Agent, or Firm—Foley & Lardner

(57) ABSTRACT

A device for and a method of processing biometric data, particularly finger print data, with a processing unit, comprises a sensor to detect the biometric input signal and a processor for processing the input signal for creation of identification data, which individualize a person. The processing unit can be connected with a portable identification element featuring an evaluation unit operating in a manner such that the reference data allocated to a person and stored in a semiconductor component of the portable identification element can be checked against the identification data for matches. Evaluation comprises a comparison of similarities. Thus, it can be determined as a function of a pre-set threshold value whether or not the identification data and the reference data match.

21 Claims, 3 Drawing Sheets

METHOD AND DEVICE FOR PROCESSING BIOMETRIC DATA

BACKGROUND OF THE INVENTION

1. Field of the Invention

The invention relates to a device for and a method of processing biometric data.

2. Description of the Related Art

From European Patent EP 0 372 762 B1, a procedure for processing biometric data is known which involves a comparison of several characteristic points (minutiae) allocated to the respective finger print images, serving to identify a finger print. A finger print sensor detects several finger print images and determines the minutiae in the form of digitized data. This procedure is applied to two consecutive finger prints. To determine whether the finger prints are identical, the minutiae of the first finger print and of the second finger print are compared with each other. If the number of identical minutiae is higher than a preset threshold value, the finger prints are assumed to match. The disadvantage of this procedure is that the finger prints serving as a reference are stored without protection in a processing unit of the device, so that manipulation and tampering of the finger print data is possible.

From German Publication DE 44 39 593 C2, a device for processing biometric data is known which provides for evaluation and/or comparison of biometric data in a chip card. This lowers the danger of manipulation and/or unauthorized use of data, because the data serving as reference does not leave the chip card.

From German Publication DE 196 18 144 C1, a device for processing biometric data is known in which biometric data allocated to a certain person are stored as reference data on a portable identification element. These reference data are verified for agreement with identification data which are supplied through a sensor. In this process, the identification data are determined on the basis of the biometric input signals of the sensor. The disadvantage of the known device is that the sensor is integrated in the portable identification element. This involves a sophisticated card design, which leads to a considerable increase in the manufacturing costs for these cards. Due to the fact that the sensor is closely interlocked with the material of the card, replacement of a defective sensor or upgrading to an enhanced sensor is impossible.

SUMMARY OF THE INVENTION

Thus, the object of the present invention is to process biometric data while ensuring data safety during the evaluation of biometric data in a simple manner.

To solve this task, a device according to the invention comprises: a processing unit and an identification element which stores reference data. The processing unit further comprises: a sensor to detect a biometric input signal; and a processor for processing said input signal to create identification data. A comparison program checks for a match between the reference data and the identification data. The comparison program is divided into a first part running on the processor and a second part running on the identification element.

In one embodiment, the identification element is portable. The identification element may comprise a semiconductor component, and the second part of the comparison program may be set to run on the semiconductor component.

In a further embodiment, at least a portion of the identification data and the reference data are processed in the second part of the comparison program running on the semiconductor component.

In a further aspect of the invention, the first part and the second part of the comparison program each comprise at least one verification step. Preferably, the last of the verification steps is performed in the semiconductor component, and a confirmation signal is emitted from the semiconductor component to the processing unit in case of a positive result.

In yet a further aspect of the present invention, the comparison program comprises a comparison of similarities in which parameter-dependant comparative values are compared with a pre-set threshold value for decision. The threshold value is preferably stored in at least one of a protected memory area of the identification element and the processing unit.

In a further aspect of the invention, weighted comparative values are formed in the first and the second parts of the comparison program, and a confirmation signal may be transmitted from the identification element to the processing unit when a total of comparative values exceeds the threshold value for decision.

In a yet further embodiment of the invention, an alignment between the identification data and the reference data is performed in the processing unit before the comparison program checks for a match. Only a portion of the reference data may be transferred from the identification element to the processing unit for the alignment.

By way of example, the sensor may be an optical, thermal or electronic sensor.

In a yet further embodiment of the invention, the identification element is a chip card comprising a microprocessor. The microprocessor may further comprise: a semiconductor component; and a contact area, the contact area being flush with a surface of the card. A card reader for reading from and writing to the semiconductor component may be integrated into the processing unit.

A confirmation signal generated by the identification element may be provided with an electronic signature.

A method according to the invention comprises the steps of: detecting at least one biometric input signal; creating identification data from the input signal; transmitting the identification data to an identification element; comparing the identification data with reference data, the reference data being stored in the identification element and the comparing being based on parameters; and emitting a confirmation signal, the confirmation signal being a function of a result of the step of comparing.

A further embodiment of the method may also comprise a step of aligning of identification data to reference data that is performed before the step of comparing.

DESCRIPTION OF THE PREFERRED EMBODIMENTS

The invention will be described in detail below with reference to the drawings.

Figure 1:
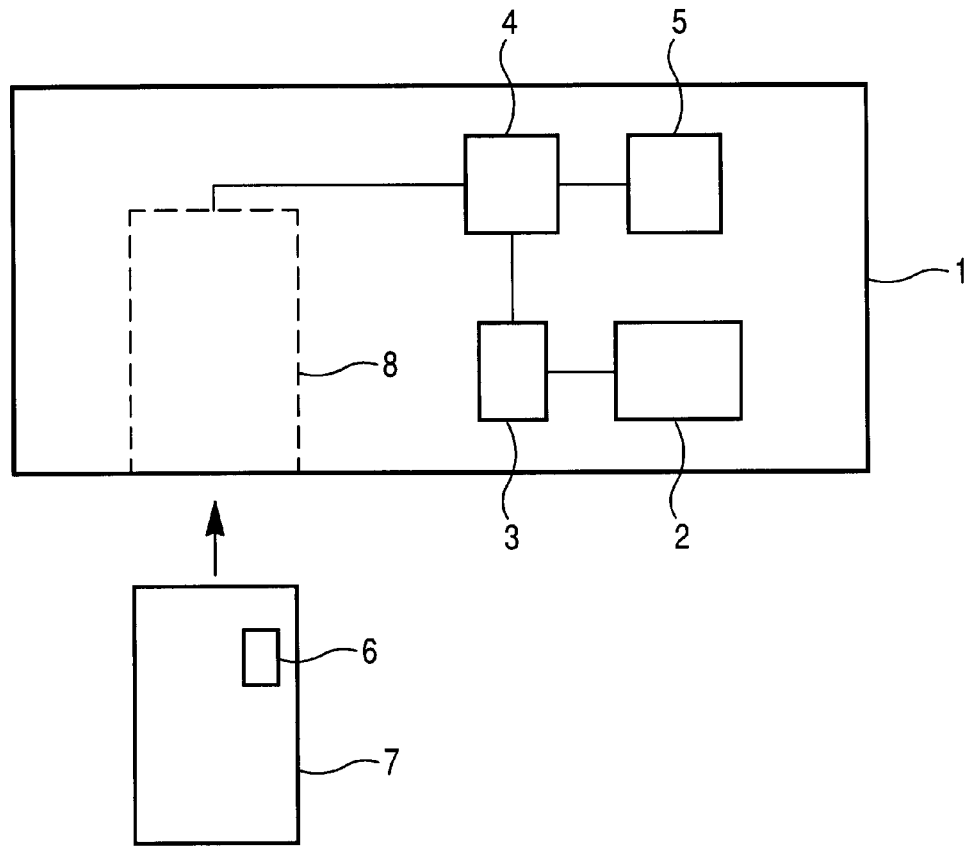
FIG. 1 is a schematic view of the invention according to a first embodiment.

A device as provided for by the invention can be used for the identification of persons. As can be seen in FIG. 1, the device according to the invention comprises a processing unit 1, which is equipped with an optical sensor 2 for detection of a finger print. Alternatively, the sensor 2 can also be designed as a thermal or electronic sensor or other appropriate sensor. The output signal of sensor 2 is digitized by a converter 3 and is introduced in digitized form to a processor 4. Characteristic points of the finger print (minutiae) are derived from the image data and stored in a memory unit 5 for intermediate storage or buffering. In memory unit 5, the minutiae are present as identification data, including information in binary form about their coordinates as well as their orientation (angle) and their type.

Minutiae of the person to be identified are stored in binary form as reference data in a semiconductor component 6 of a chip card 7. Furthermore, a comparison program is stored in the semiconductor component 6, with the aid of which a comparison of the detected identification data with the reference data on the chip card 7 is performed.

Figure 3:
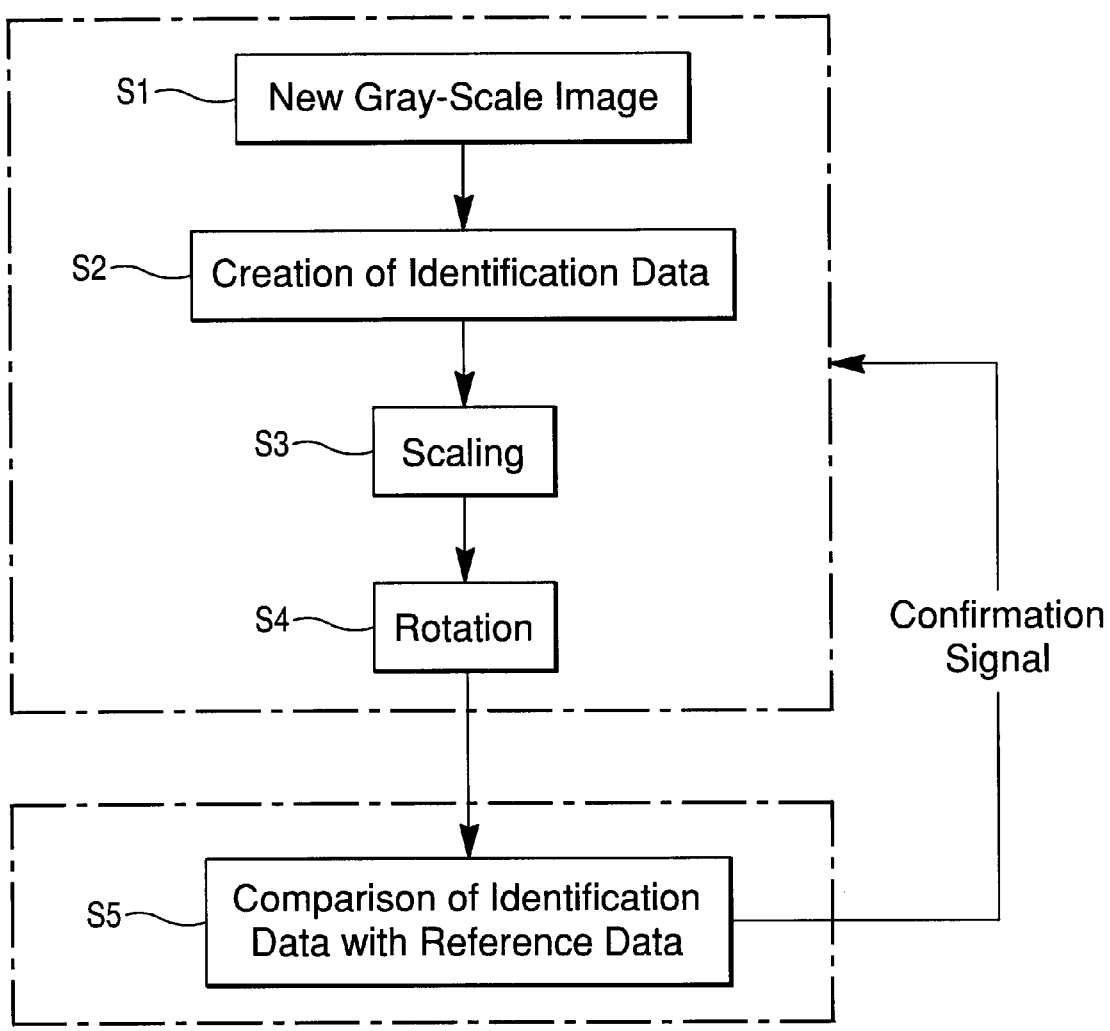
FIG. 3 is a flow chart of the method as provided for by the invention.

FIG. 3 shows how the comparison program is embedded in the comparison procedure as provided for by the invention. First, chip card 7 is inserted into the card slot provided for this purpose in the processing unit 1, with contacts of a card reader 8, which is integrated into processing unit 1, pressing on the contact field of chip card 7. After the sensor 2 has taken a finger print, a gray-scale image S1 is prepared by means of graphical and mathematical procedures. In a further step S2, the characteristic points (minutiae) are derived. These are present in binary form and are either processed immediately or stored in memory unit 5 for intermediate storage.

In the following steps S3 and S4, the detected minutiae serving as identification data are coordinated and/or aligned with the reference data stored on chip card 7. For this purpose, a scaling of identification data in relation to the reference data is performed in step S3, and a rotation of the identification data is performed in step S4. These operations are executed in the computing unit 4 of processing unit 1. Selected reference data, which are necessary for alignment but have no individualizing character, are read in from chip card 7 to serve as identification data. For example, a "delta-point" on the thumb, which occurs in the same place in most people, is selected as a reference for scaling.

Upon completion of alignment between identification data and reference data, the identification data are written into the semiconductor component 6 of chip card 7, which is equipped with a microprocessor (not shown). The comparison procedure S5 in chip card 7 is started with the number of locally matching identification and reference data being determined. In this process, the comparison criteria (e.g., coordinates, angles, and mismatch of the corresponding minutiae) of the identification data on the one hand and the reference data on the other hand are compared with each other. Also, the number of lines or finger grooves situated between the corresponding minutiae can be used as a criterion for comparison. Each of these comparison criteria is weighted with a coefficient between 0 and 1. From the total of the weighted decision criteria, a resulting comparison value is determined in the manner of fuzzy logic and is compared against a preset threshold value for the decision. The threshold value can also be weighted as a function of the set degree of data integrity. Only in the event that the comparison value is larger than the decision threshold value is a confirmation signal confirming identification transmitted to the processing unit. Otherwise, a non-confirmation signal is transmitted, and a new comparison process has to be started.

For the determination of identification data, preferably several finger print images are checked in processing unit 1 for confirmation among each other. This is performed in the manner described above, equivalent to the comparison program running on chip card 7. Only a preset number of matches among several identification data of different finger print images, which were taken within the framework of a pre-selection process, ensures that complete identification data are present. The identification data concerned are evaluated against the reference data on chip card 7 by a comparison process on chip card 7.

Semiconductor component 6 is designed in such a manner that changed comparison programs or programs tuned to a different sensor can be stored in it. It is also provided for in this context that only part of the evaluation or verification takes place on chip card 7. That part of such a comparison program, which takes place in processing unit 1, may, however, only process a limited number of individualizing reference data.

Figure 2:
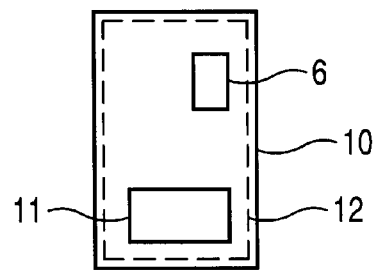
FIG. 2 is a schematic view of the invention according to a second embodiment.

In another embodiment of the invention, as shown in FIG. 2, chip card 10 itself contains a sensor field 11, in addition to semiconductor component 6, which performs the evaluation illustrated above. An electrostatic sensor is placed flush with the surface of chip card 10, below which a processing unit, which is not shown here and which performs the preparative operations for the evaluation, is directly attached. The actual evaluation for identity is then performed in semiconductor component 6. Upon determination of a match, a confirmation signal is transmitted by means of coil 12, which is integrated into chip card 10, to an external terminal, which effects the opening of a door, for example. Chip card 10 receives the energy required for evaluation and data transfer from a corresponding coil of the terminal, so that identification can only be performed in the vicinity of the terminal. A time recording program is integrated into the program running on chip card 10, which registers the time at which detection of the finger print in the sensor occurred. When evaluation is performed outside a preset interval, the confirmation signal is not emitted. In this manner, only finger prints which were detected within the area of the terminal are evaluated, and access by third parties on account of a previously stored finger print of an authorized person is prevented.

Figure 4:
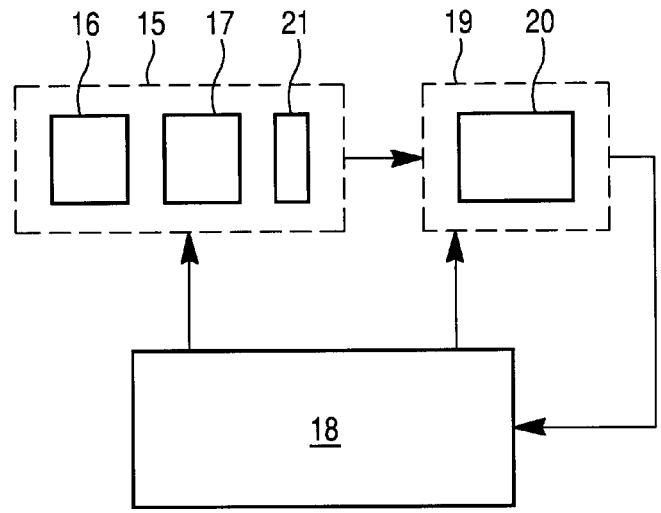
FIG. 4 is a schematic view of the invention according to a third embodiment.

According to another embodiment, shown in FIG. 4, the device consists of a sensor unit 15, into which a sensor 16 and a signal and data conditioning unit 17 are integrated. Digitalization of the input signal can also be performed in sensor 16. The signal and data conditioning unit 17 extracts the minutiae serving as identification data from the signal supplied by sensor 16. Upon request by a control unit 18 and under consideration of individual data, which are relevant for alignment and are supplied to control unit 18 by a chip card 19, the signal and data conditioning unit 17 aligns the minutiae with the reference data filed in semiconductor component 20 of chip card 19. The identification data, which are now available for the comparison process, are encoded in encoding unit 21 and then delivered to semiconductor component 20 of chip card 19. There, the identification data are decoded and subjected to the comparison process described above. The code for the encoding taking place in encoding unit 21 is transferred to encoding unit 21 by semiconductor component 20. Control unit 18 controls communication between sensor unit 15 and chip card 19. Upon completion of the comparison process, in a positive case, the confirmation signal is transmitted to control unit 18, together with an electronic signature and, if need be, additional data about the INSI-number of chip card 19 or the evaluation results. Control unit 18 will then pass on a corresponding control signal to open the door, for example. Furthermore, data about the contents of chip card 19 and/or communication of this card with sensor unit 15 can be filed in a log of the control unit and saved for documentation.

In a variation of the embodiment illustrated in FIG. 4 (and the sequence illustrated in FIG. 3), the sensor unit 15 with the signal and data conditioning unit 17 can be integrated with the evaluation unit onto one single semiconductor component 20 (chip). Here, only sensor 16 is placed flush with the surface of a chip card, and semiconductor component 20 is embedded into the body of the card. This is a further enhancement to avoid forgery. The device may be used not only for the identification of persons, but also for identification purposes where animals or objects are to be identified.

Figure 5:
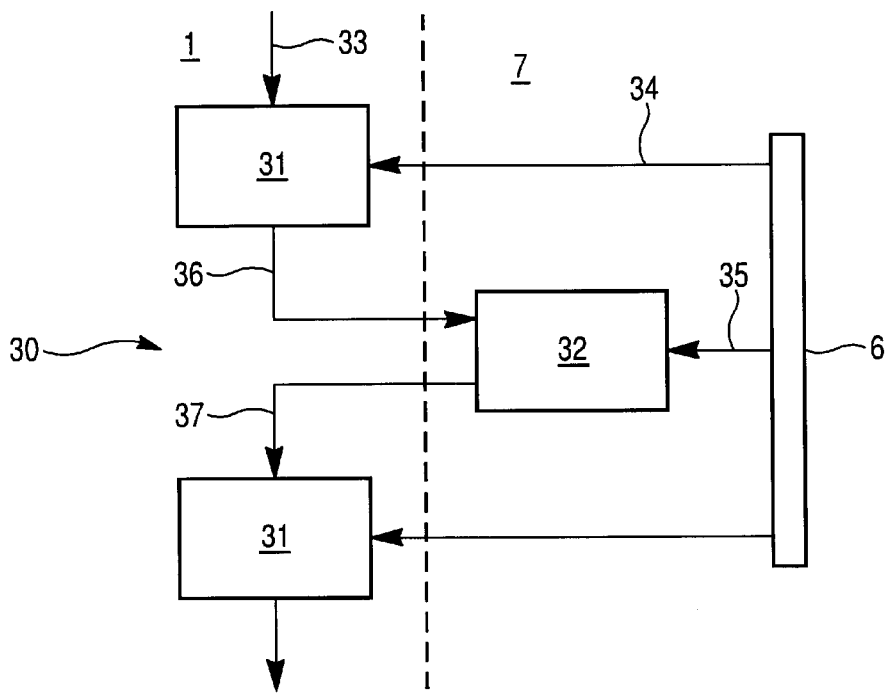
FIG. 5 is a block diagram regarding the structure of an algorithm running in the comparison program.

As shown in FIG. 5, an algorithm 30 performing the comparison of similarities may be divided into a main part 31 and an auxiliary part 32, with the auxiliary part 32 processing the sensitive data (sensitive reference data and/or sensitive identification data). The auxiliary part 32 is executed in a protected part of the device, preferably the semiconductor component 6 of the chip card. The process of algorithm 30 can be planned as follows. In an initial main part 31 of algorithm 30, which is run on processing unit 4, identification data 33 and reference data 34 are processed as input values, sufficient for alignment or coordination of identification data and reference data. In the subsequent auxiliary part 32, the comparison of similarities between sensitive data, i.e. reference data 35, which individualize the person to a high degree and are filed on chip card 7, and the corresponding identification data 36, which were supplied from main part 31, takes place. Subsequently, algorithm 30 is continued in main part 31 to which the output data 37 of auxiliary part 32 are supplied as encoded data. There, further processing takes place, and an indication is given to the processing unit, whether or not a match between identification and reference data has been found.

Alternatively, main part 31 may also include an initial part of the verification steps, with subsequent intermediate steps of the comparison program on semiconductor component 6 running in auxiliary part 32. The intermediate result obtained by this is transmitted to computing unit 4 of processing unit 1, with further verification steps being performed there subsequently. This segmentation of processing steps in processing unit 1 on the one hand and chip card 7 on the other hand can be repeated several times. What is essential is that the last processing step is performed in semiconductor component 6 of card 7 and that a final confirmation signal is then emitted to processing unit 1 for clearing. The advantage to be achieved by this segmentation consists in the fact that if the initial steps performed in the processing unit lead to a negative result, communication between processing unit 1 and chip card 7 can be aborted, without any prior complete reading of sensitive data from chip card 7.

The advantage of the present invention consists in particular in the fact that a simple structure of the device is warranted by a segmentation or division of a comparison program serving verification purposes on the processing unit on the one hand and the portable identification element on the other hand. For application of the biometric procedure, the sensor 2 can be attached to existing processing units as an accessory, while the portable identification element remains unaltered in its physical form. New security technologies, particularly with respect to the sensor 2, can be implemented easily, only requiring reconfiguration of the portable identification element with the aid of new software. Furthermore, this procedure is cost-advantageous, because for each processing unit, only one sensor 2 is required, since it can be applied in combination with several identification elements.

A threshold value, which is dependent on parameters, is set preferably in a protected memory area on the semiconductor component of the chip card. Thus, a high degree of security in identification verification is achieved.

By designing a device according to the present invention as an identification element with one single semiconductor component, an enhanced ability to avoid forgery is obtained, because the binary data, or the comparison of identification and reference data, are arranged on one single chip.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

This redlined draft, generated by CompareRite (TM)—The Instant Redliner, shows the differences between original document: C:\FLCONV\FLTEMP.DOC and revised document: C:\FLCONV\FLTEMP2.DOC CompareRite found 217 change(s) in the text Deletions appear as Overstrike text surrounded by { }

Additions appear as Double Underline text surrounded by [ ]

What is claimed is:

1. A device for processing biometric data, comprising:
   a processing unit, said processing unit further comprising:
      a sensor to detect a biometric input signal; and
      a processor for processing said input signal to create identification data; and
   an identification element comprising a semiconductor component, said identification element storing reference data,
   wherein a comparison program in said device checks for a match between said reference data and said identification data, and wherein said comparison program is divided into a first part running on said processor and a second part running on said identification element;
   wherein said second part of said comparison program runs on said semiconductor component; and wherein said first part and said second part of said comparison program each comprise at least one verification step; and
   wherein weighted comparative values are formed in said first and said second parts of said comparison program and wherein a confirmation signal is transmitted from said identification element to said processing unit when a total the of weighted comparative values exceeds a pre-set threshold value for decision.

2. The device according to claim 1, wherein said identification data is for a person.

3. The device according to claim 1, wherein said identification element is portable.

4. The device according to claim 1, wherein at least a portion of said identification data and said reference data are processed in said second part of said comparison program running on said semiconductor component.

5. The device according to claim 1, wherein a last verification step of said verification steps is performed in the semiconductor component, and wherein a confirmation signal is emitted from the semiconductor component to the processing unit in case of a positive result.

6. The device according to claim 1, wherein said threshold value is stored in at least one of a protected memory area of said identification element and said processing unit.

7. The device according to claim 1, wherein an alignment between said identification data and said reference data is performed in said processing unit before said comparison program checks for a match, and wherein only a portion of said reference date is transferred from said identification element to said processing unit for said alignment.

8. The device according to claim 1, wherein said sensor is an optical, thermal or electronic sensor.

9. The device according to claim 1, wherein said identification element is a chip card comprising:

microprocessor formed in a semiconductor component; and a contact area, said contact area being flush with a surface of said card, wherein a card reader for reading from and writing on said semiconductor component is integrated into said processing unit.

10. The device according to claim 1, wherein a confirmation signal generated by said identification element is provided with an electronic signature.

11. The device according to claim 1, wherein said processing unit and said identification element are integrated onto a single chip card.

12. The device according to claim 1, wherein said sensor and said identification element are integrated onto a single chip card.

13. A method for processing biometric data, comprising the steps of:

detecting at least one biometric input signal;

creating identification data from said input signal in a first unit;

transmitting said identification data to an identification element in a chip card;

comparing said identification data with reference data, using a first comparison step performed in the first unit, and a second comparison step performed in said identification element, wherein said chip card is separate from said first unit, said reference data being stored in said identification element, said comparing based on parameters, wherein said comparing step comprises forming parameter-dependent comparative values in first and second comparison steps;

determining if a total of comparative values exceeds a pre-set threshold value for decision; and emitting a confirmation signal, when the total of the comparative values exceeds the threshold values for decision.

14. The method according to claim 13, wherein said identification data are compared with the reference data through a comparison of similarities.

15. The method according to claim 13, wherein a step of aligning of identification data to reference data is performed before said step of comparing.

16. The method according to claim 13, wherein said identification element performing a second comparison part is portable and includes a semiconductor component in which said second comparison part is performed.

17. The method according to claim 13, wherein each of said first comparison part and said second comparison part steps comprises at least one verification step.

18. The method according to claim 16, wherein each of said first comparison part and said second comparison part steps comprises at least one verification step.

19. The method according to claim 16, wherein said second comparison part step comprises the steps of:

performing a last verification step in said semiconductor component; and emitting a confirmation signal from said semiconductor component in case of a positive result.

20. The method as defined in claim 13, comprising the step of storing said threshold value in a protected memory area in at least one of said processor and said identification element.

21. The method as defined in claim 13, further comprising the steps of:

prior to said comparing step, transferring less than all of said reference data from said identification element to said processor; and aligning said transferred identification data and said reference data.

* * * * *